United States Patent
Foster et al.

(10) Patent No.: US 7,503,061 B2
(45) Date of Patent: Mar. 10, 2009

(54) SECURE RESOURCE ACCESS

(75) Inventors: Ward Scott Foster, Boise, ID (US);
Robert John Madril, Jr., Boise, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1080 days.

(21) Appl. No.: 10/396,271

(22) Filed: Mar. 24, 2003

(65) Prior Publication Data
US 2004/0193887 A1 Sep. 30, 2004

(51) Int. Cl.
*H04L 9/32* (2006.01)
(52) U.S. Cl. ................... 726/2; 726/3; 726/4
(58) Field of Classification Search ........... 713/167, 713/155–156, 168, 173, 176, 189, 193; 726/1–7; 709/217–219, 225, 229
See application file for complete search history.

(56) References Cited

U.S. PATENT DOCUMENTS

| | | | | |
|---|---|---|---|---|
| 5,220,603 A | * | 6/1993 | Parker | 713/156 |
| 6,609,198 B1 | * | 8/2003 | Wood et al. | 713/155 |
| 7,185,192 B1 | * | 2/2007 | Kahn | 713/155 |
| 2002/0144119 A1 | * | 10/2002 | Benantar | 713/171 |
| 2004/0030887 A1 | * | 2/2004 | Harrisville-Wolff et al. | 713/155 |
| 2004/0117615 A1 | * | 6/2004 | O'Donnell et al. | 713/155 |
| 2007/0044144 A1 | * | 2/2007 | Knouse et al. | 726/8 |

* cited by examiner

*Primary Examiner*—Hosuk Song (57) ABSTRACT

A method and system for providing a first network resource with secure but limited access to a second network resource. A method embodying the invention includes receiving from the first resource, digitally signed instructions to access the second resource. Data used to digitally sign the instructions is obtained, and, using the obtained data, it is verified that the instructions originated from an authorized source other than the first resource. Access to the second resource is granted only upon verifying that the instructions originated from an authorized source other than the first resource. Beneficially, the first resource cannot access the second without the user's knowledge or, at least, implicit consent.

32 Claims, 5 Drawing Sheets

SECURE RESOURCE ACCESS

FIELD OF THE INVENTION

The present invention is directed to accessing a distributed resource. More particularly, the invention is directed to providing secure but limited access to a resource in a distributed environment.

BACKGROUND OF THE INVENTION

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses a resource over the Internet. Accessing data provided by the client or located and retrieved from another device, the resource performs specified tasks. These tasks include, among a multitude of others, manipulating the data as instructed, returning the data for use by the client, and/or sending data to a printer for production.

The following provides a more specific example of a distributed computing system utilized to print documents. A client computer, utilizing a web browser and the Internet, accesses a web server providing a document printing resource. The web server may be running on a device connected to or networked with one or more printers. Alternatively, the web server may be embedded in the printer itself. The printing resource locates available printers and a data resource managing electronic documents. The printing service then returns to the browser a graphical interface containing user accessible controls for selecting a document from the data resource as well as controls for selecting a printer. Selections made through the interface are returned to the printing resource. Accessing the data resource, the printing resource retrieves and/or sends the selected document to the selected printer for production.

Accessing distributed resources raises a number of security considerations. Access to a resource may be limited for commercial or privacy purposes. Using the example above, a user may be a paid subscriber enabling access to the printing resource. The user may pay a flat rate or may pay for each use. For commercial security, the user may be required to present credentials such as a user name and password in order to access the printing resource. The same may be true for the data resource. However, presenting credentials to the data resource also promotes user privacy. A user may store documents on the data resource that the user desires to keep private and secure.

Granting one resource access to another resource compounds the security considerations. Using the example above, a user presents one set of credentials to access the printing resource. The user then provides the printing resource with a second set of credentials needed to access the data resource. Here lies the problem. Conventional communication techniques such as Secure Hypertext Protocol provide the user reasonable assurance that third parties cannot intercept credentials being passed. However, the user has no assurance that the printing resource will not again access the data resource using the provided credentials without the user's consent or knowledge.

SUMMARY

Accordingly, the present invention is directed to providing a first network resource with secure but limited access to a second network resource. A method according to one embodiment of the invention includes receiving from the first resource, digitally signed instructions to access the second resource. Data used to digitally sign the instructions is used to verify that the instructions originated from an authorized source other than the first resource. Access to the second resource is granted only upon verifying that the instructions originated from an authorized source other than the first resource. Beneficially, the first resource cannot access the second without the user's knowledge or, at least, implicit consent.

DETAILED DESCRIPTION

Glossary:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Client—Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, such as SOAP (Simple Object Access Protocol).

Interface: The junction between a user and a computer program providing commands or menus through which a user communicates with the program. The term user in this context represents generally any individual or mechanism desiring to communicate with the program. For example, in the client-server model defined above, the server usually generates and delivers to a client an interface for communicating with a program operating on or controlled by the server device. Where the server is a web server, the interface is a web page. The web page when displayed by the client device presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

Introduction: In distributed computing environments, a user employs a client to access a particular application running on a server device. The user directs the application to manipulate electronic data located anywhere on a computer network. To do so, the user must provide the application with the information required to locate and access the data. It is expected that various embodiments of the present invention will enable the provision of this information with minimal user interaction while maintaining the user's security and privacy.

Although the various embodiments of the invention disclosed herein will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Figure 1:
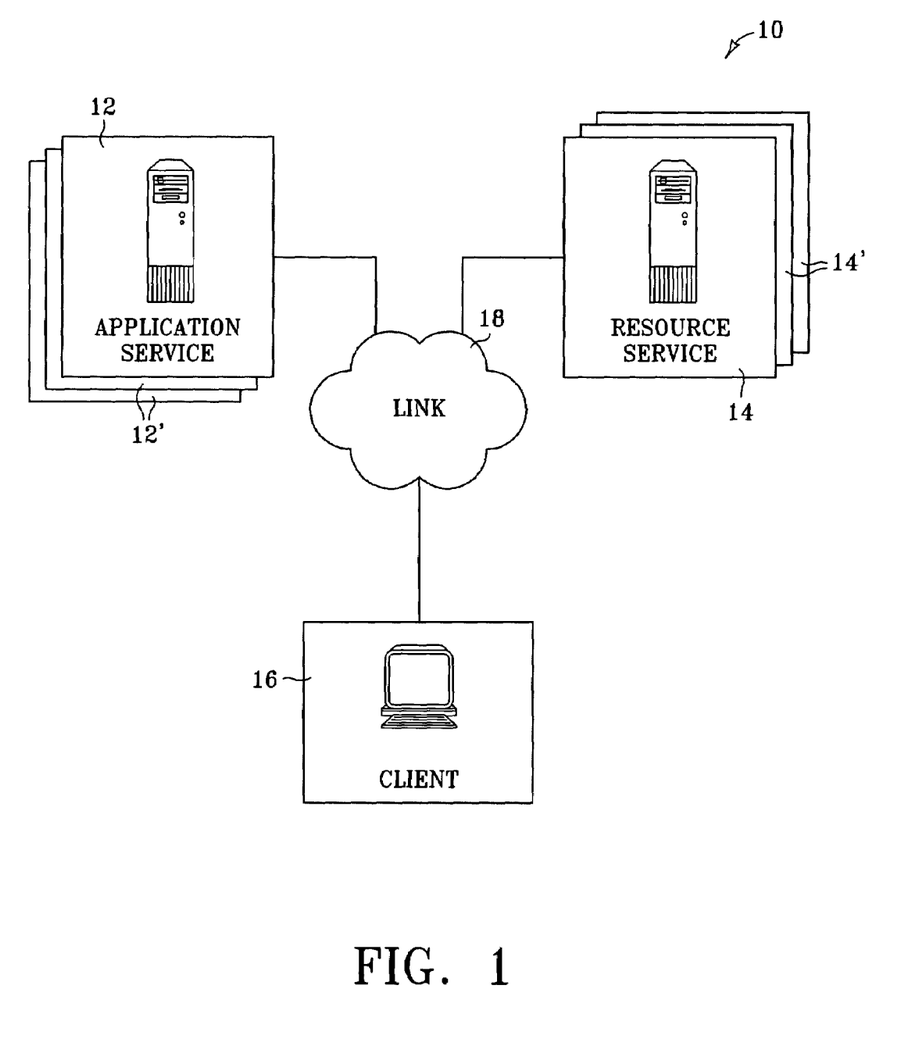
FIG. 1 is a schematic representation of a computer network in which various embodiments of the present invention may be incorporated.

Referring to FIG. 1, computer network 10 represents generally any local or wide area network in which a variety of different electronic devices are linked. Network 10 includes application service 12, resource service 14, and client 16 all interconnected by link 18. Application service 12 represents generally any combination of programming and/or hardware capable of distributing an application over network 10. Resource service 14 represents any combination of hardware and/or programming capable of providing a resource to a distributed application. Client 16 represents any combination of hardware and/or programming capable of interacting with application service 12 and resource service 14. Network 10 may also include one or more additional application services 12' and one or more additional resource services 14'.

Link 18 interconnects devices 12-16 and represents generally a cable, wireless, or remote connection via a telecommunication link, an infrared link, a radio frequency link, or any other connector or system that provides electronic communication between devices 12-16. Link 18 may represent an intranet, an Internet, or a combination of both. Devices 12-16 can be connected to network 10 at any point and the appropriate communication path established logically between the devices.

Components: The logical components of one embodiment of the invented data access system will now be described with reference to the block diagram of FIG. 2. Application service 12 includes application 20, application server 22, and resource module 24. Application 20 represents generally any application or other resource capable of being distributed over network 10. Application server 22 represents generally any programming capable of distributing application 20. Application server 22 is also capable of generating or otherwise providing an interface and/or content for an interface to be displayed by client 16 enabling a user to interact with application 20. Resource module 24 represents generally any programming capable of interacting with resource service 14. Resource module 24 is also capable of providing an interface or content for an interface enabling a user to interact with resource service 14.

Figure 2:
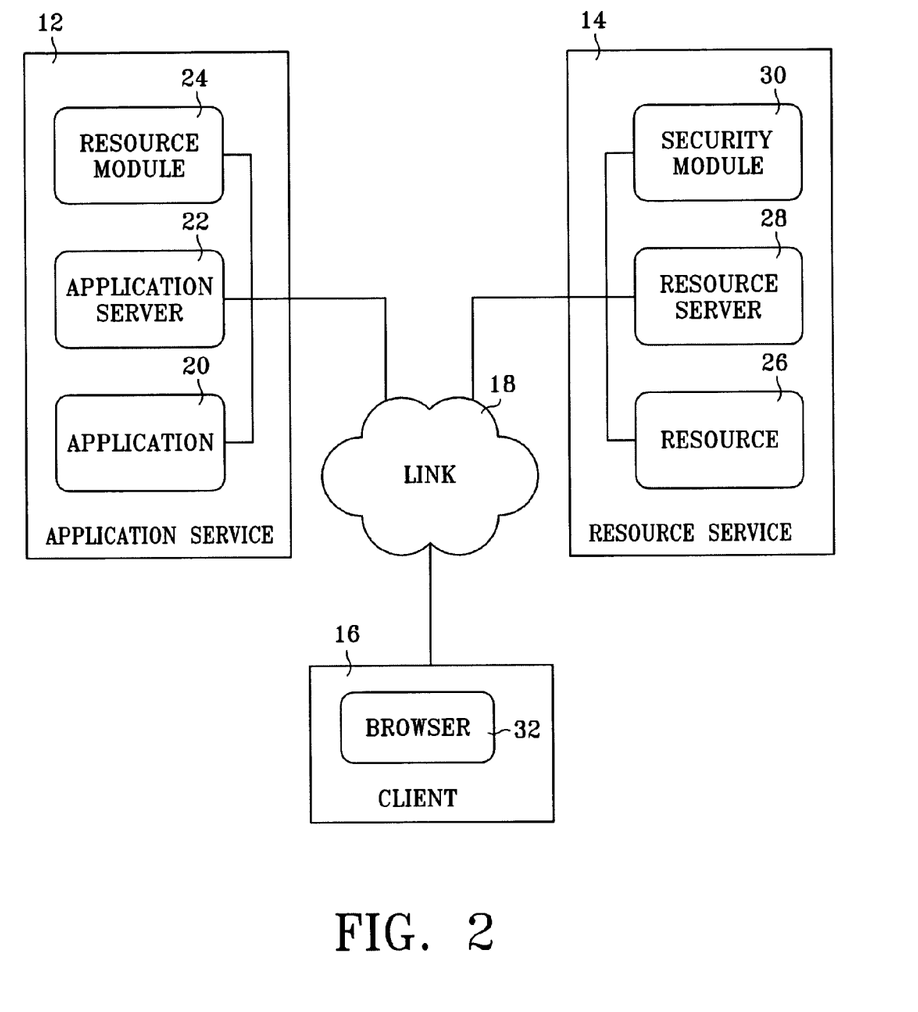
FIG. 2 is a block diagram of the network of FIG. 1 illustrating the logical program components operating on each device according to an embodiment of the present invention.

Resource service 14 includes resource 26, resource server 28, and security module 30. Resource 26 represents generally any programming and/or electronic data capable of being accessed and utilized over network 10. Resource server 28 represents any programming capable of making resource 26 available over network 10. Security module 30 represents any programming capable of limiting access to resource 26 to those providing verifiable credentials.

It is expected that servers 22 and 28 will be web servers. Application 20 and resource 26, then, may be web sites, web services, or a combination of the two. Client 16 contains browser 32 capable of communicating with servers 22 and 28. Alternatively, in some instances, servers 22 and 28 may be accessed or communicated with programmatically—not using browser 32.

Figure 3:
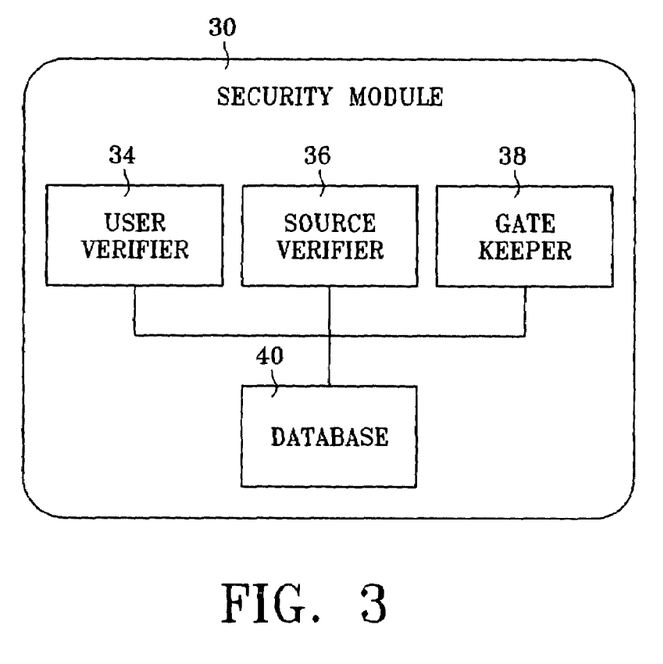
FIG. 3 is a block diagram illustrating the logical components of a security module according to an embodiment of the present invention.

Referring now to FIG. 3, security module 30 includes user verifier 34, source verifier 36, gate keeper 38, and database 40. User verifier 34 represents generally any programming capable of authenticating credentials needed to access resource 26. Credentials may take the form of a user name and password pair. More sophisticated credentials include, for example, data representing a biometric scan of a user's fingerprint or iris. Source verifier 36 represents any programming capable of verifying that a request to access resource 26 originated from a user through, for example, client 16. In other words, source verifier 36 includes programming capable of verifying that a user directed application service 12 to request access to resource 26. The term "user" in this case includes client 16, browser 32, and/or another program, device, or individual. Gate keeper 38 represents any programming capable of granting a request to access resource 26 only where the credentials are properly authenticated and the source of the request is properly verified. Credential database 40 represents any logical memory to contain data used by user verifier 34 and source verifier 36 to complete their assigned tasks.

Figure 4:
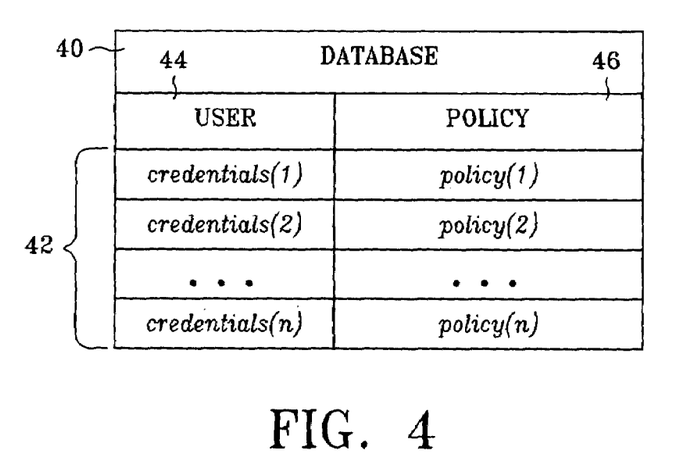
FIG. 4 is a table illustrating a database according to an embodiment of the present invention.

Referring to FIG. 4, database 40 includes any number of entries 42. Each entry is associated with a particular user who is authorized to access resource 26. Each entry includes user field 44 and policy field 46. User field 44 contains data identifying a particular user such as the user's credentials. Policy field 46 contains policy data used to specify user involvement when authorizing access to resource 26. In other words, the policy data reflects the level of trust a user has in a particular application service 12. For example, a user may want to personally authorize or deny all requests made of resource service 14 on behalf of application service 12, or the user may trust application service 12 and authorize all such requests. Alternatively, a user may initiate a program session with application service 12 and desire that all requests to access resource service 14 made on behalf of application service 12 be authorized automatically—but only for that session. In this case, the policy data will include session data, such as an alphanumeric string, identifying a current authorized session. The policy field 46 for a given entry may contain policy data relating to any number of application services 12 and 12'. This allows a user to set different trust levels for different application services 12 and 12'.

The block diagrams of FIGS. 2 and 3 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s). While application service 12 and resource service 14 are shown as distinct components of network 10, both may operate as a single component. Moreover, individual elements of application service 12 and resource service 14 may be found on more than one device. For example, security module 30 need not be included in resource service 14. It may instead operate on a computing device independent from resource service 14, application service 12, and client 16. Security module 30 need only be accessible to resource service 14 through link 18.

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

Operation: The operation of the invented data access method will now be described with reference to the flow diagram of FIG. 5, which illustrates the steps taken to enable application 20 to obtain access to resource 26. A user requests access to application service 12 through client 16 (step 50). Typically this involves using browser 32 to browse to a network address established for application server 22. Application server 22 receives the request and, in response, establishes an application session and generates or otherwise provides and returns to client 16 an interface that contains content for interacting with application 20 and resource 26—the returned interface includes content enabling the user to instruct application service 12 to access resource 26 (step 52). The returned interface also includes a session identifier. Due to the nature of a distributed environment, application service 12 may be presenting interfaces to any number of clients at a given time. The session identifier represents the particular application session established in response to client 16 accessing application service 12 in step 50. Client 16 opens the interface (step 54). The session interface may, at this point, contain content for interacting with application 20. However, as resource service 14 has not been accessed, the session interface does not yet contain content for interacting with resource 26.

Figure 5:
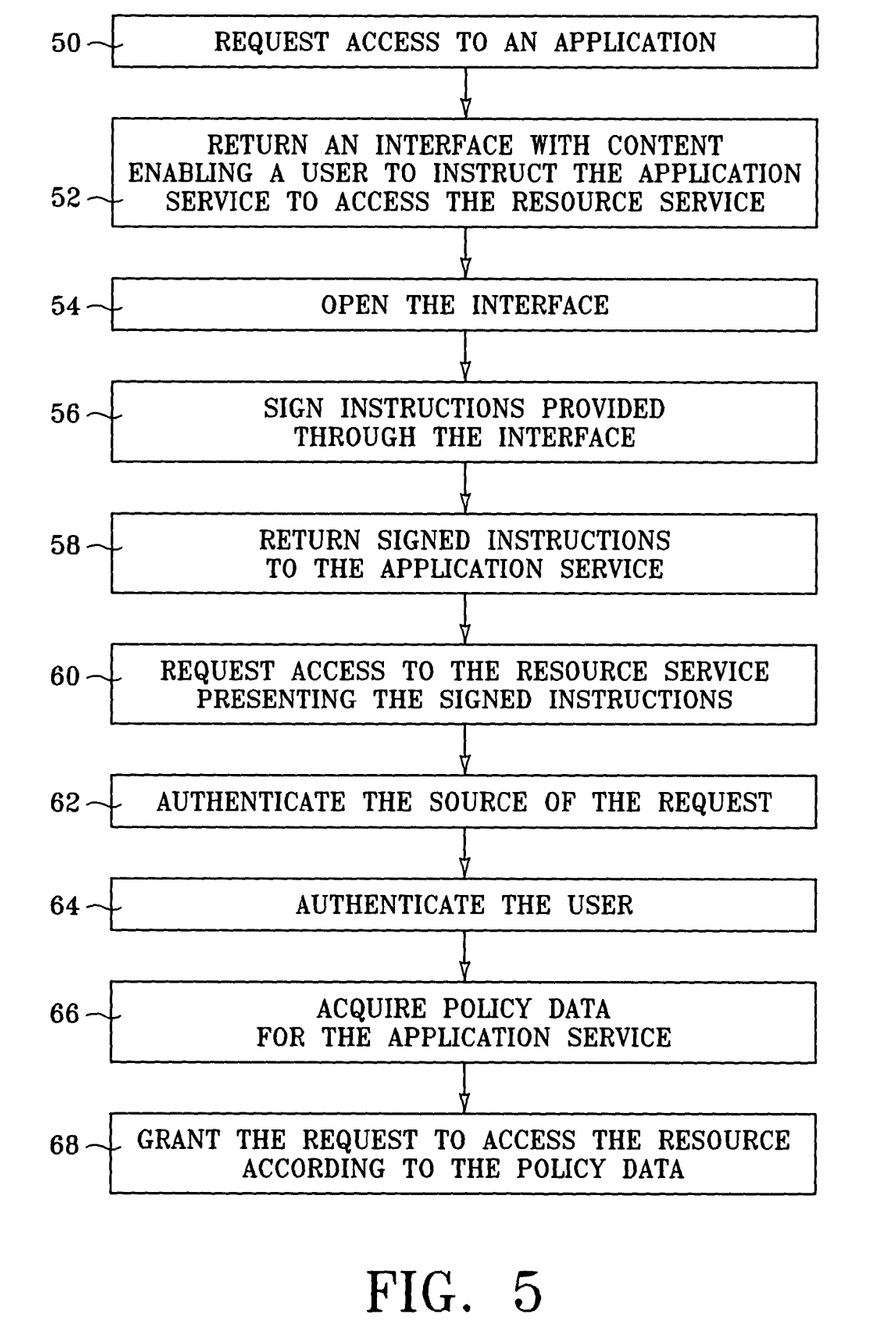
FIG. 5 is a flow diagram illustrating steps taken to provide a first resource, taking the form of a distributed application, access to a second resource.

Upon opening the session interface, the user provides instructions directing application service 12 to access resource 26. The instructions may include data identifying resource service 14 as well as credentials needed to access resource 26. The credentials may be provided manually, for example, in the form of a user name and password entered by the user. Alternatively, the credentials may be stored, for example, on the client device in the form of a cookie and provided without user involvement. A cookie is a message given to a browser by a web server. The browser usually stores the message in a text file. The message, in many cases, is a simple alphanumeric data string unique to the given browser. The message is then sent back to the server each time the browser sends a request to the web server. In this case the cookie's message would include the credentials needed to access resource 26. When browser 32 accesses application service 12, application server 22 can retrieve the cookie.

Browser 32 or other programming operating on behalf of client 16 signs the instructions with data identifying the user (step 56). It is expected that signing will involve signing the instructions with a user's digital certificate. A digital certificate is an attachment to an electronic message used for security purposes. The most common use of a digital certificate is to verify that a user sending a message is who he or she claims to be, and to provide the receiver with the means to encode a reply. An individual wishing to send an encrypted message applies for a digital certificate from a Certificate Authority (CA). The CA issues an encrypted digital certificate containing the applicant's public key and a variety of other identification information. The CA makes its own public key readily available through print publicity or perhaps on the Internet. The recipient of an encrypted message uses the CA's public key to decode the digital certificate attached to the message, and verify the certificate as being issued by the CA.

Client 16 returns the signed instructions to application service 12 (step 58). Application server 22 receives and forwards the signed instructions to resource module 24. Resource module 24 request access to resource 26 presenting the signed instructions (step 60). Resource server 28 receives and forwards the request and signed instructions to security module 30. Acquiring the data used to sign the instructions, source verifier 36 verifies that the instructions originated with the user (step 62). Where the acquired data is a digital certificate, source verifier 36 acquires the public key for the CA who issued the digital certificate. Source verifier 36 then decodes the digital certificate used to sign the instructions, and verifies the certificate as being issued by the CA and, thus, that the instructions originated with the user.

User verifier 34 then authenticates the user verifying the validity of the credentials provided with the signed instructions (step 64). To do so, user verifier 34 searches database 40 for an entry 42 that contains the provided credentials. If none is found, then the user cannot be authenticated. Where such an entry 42 is found, gate keeper 38 acquires policy data from that entry 42 for application service 12 (step 66) and grants the request to access resource 26 according to the policy data (step 68).

With access granted, resource module 24 communicates as instructed with resource 26 enabling application server 22 to return to client 16 interface content enabling the user to interact, at least indirectly, with resource 26.

Where no policy data for application service 12 exists in the located entry 42, security module 30 provides client 16, ether directly or through application service 12, with interface content enabling the user to set policy data for application service 12. Where the policy data for application service 12 in the located entry 42 indicates that the user must authorize each request, security module 30 provides client 16, ether directly or through application service 12, with interface content enabling the user to grant or deny authorization for application service 12 to access resource 26.

Where the policy data for application service 12 indicates that the user has authorized all requests made on behalf of application service 12 for a given session, security module 30 acquires data identifying the session established when client 16 accessed application service 12 in step 50. Security module 30 then determines whether the user has granted authorization for that session. If not, security module 30 returns interface content enabling the user to grant or deny authorization. Where the policy data for application service 12 indicates that the user explicitly trusts application service 12 and authorizes all requests made on its behalf, no action is taken.

Figure 6:
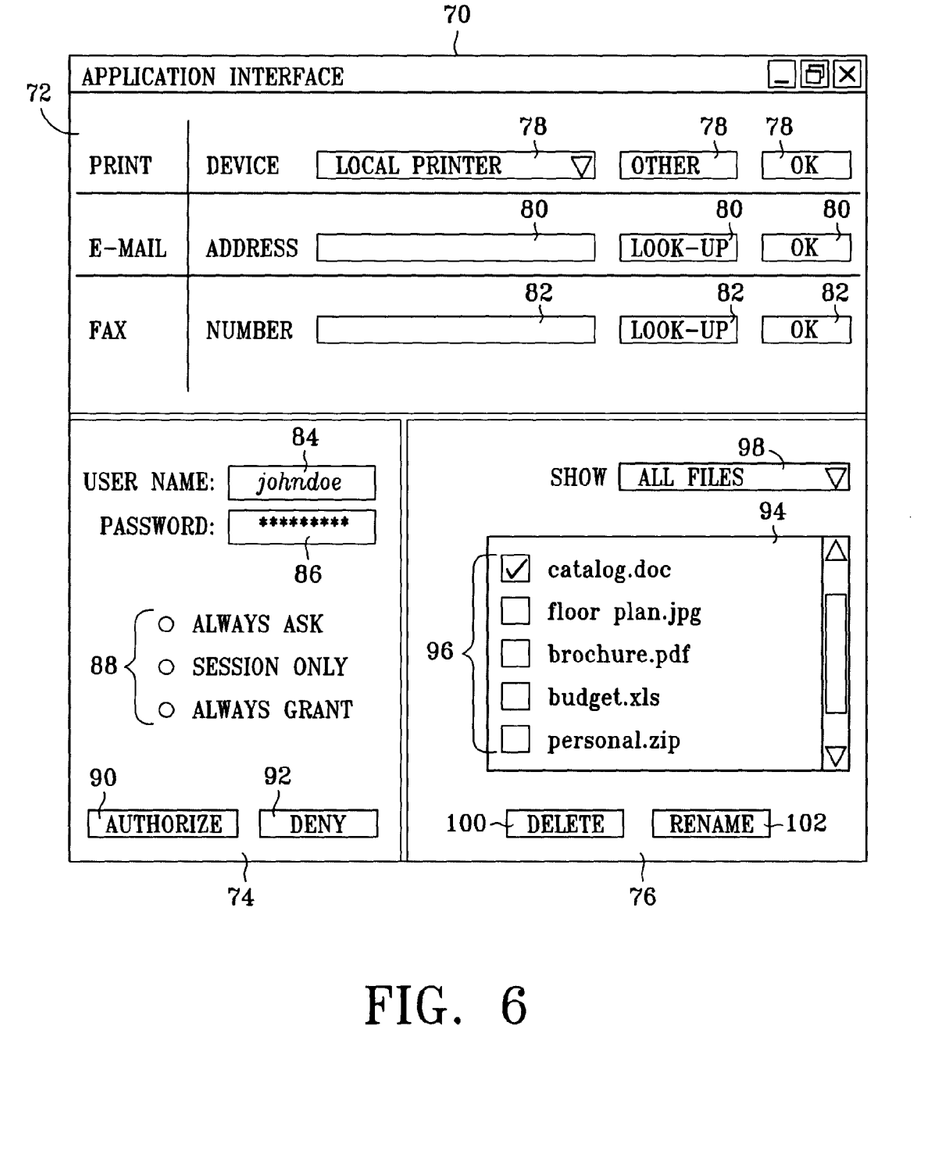
FIG. 6 is an exemplary screen view of an interface for producing electronic documents generated according to an embodiment of the present invention.

FIG. 6 is an exemplary screen view of an interface, in this case a framed web page 70, designed to enable a user to interact, at least indirectly, with application service 12 and resource service 14. A framed web page is one that divides the browser's display area into two or more sections or frames. The actual content of each frame is not provided by the framed web page itself. Rather, the framed web page provides, for each frame, a network address for accessing content to be displayed in that frame.

In this example, application 20 is a network resource providing document production services while resource 26 is a network resource providing remote document management. Web page 70 includes first frame 72, second frame 74, and third frame 76. First and second frames frame 72 and 74 contain controls for interacting with application 20. Third frame 76 contains controls for selecting and managing electronic documents managed by resource 26. The content for first frame 72 may be provided to and displayed by browser 32 after opening the interface, in this case framed web page 70, in step 54. The content for the second frame 74 is provided after resource module 24 requests access to resource 26 in step 60. Content for the third frame 76 is not provided until resource 26 is accessed following step 68.

First frame 72 includes controls 78-82 for printing, e-mailing, and faxing a document or documents ultimately selected in third frame 76. Using controls 78, a user can instruct application 20 to print a selected document. Using controls 80 or 82, the user can instruct application 20 to send the selected document to a particular e-mail address or fax the document to a particular number.

Second frame 74 includes controls 84-92. Controls 84 and 86 are text boxes enabling a user to manually provide credentials for accessing resource 26 and provided, if necessary, with the signed instructions returned in step 58. Controls 88 are radio buttons enabling a user to set or modify policy data if needed. Controls 90 and 92 are command buttons enabling a user to grant or deny authorization for application service 12 to access resource service 14.

Third frame 76 includes a scroll menu 94 displaying electronic documents managed by resource 26. In this example scroll menu 94 includes check boxes 96 allowing the user to select one or more of the displayed documents. Here, the document "catalog.doc" has been selected. Also included is pull down menu 98 and command buttons 100 and 102. Pull down menu 98 allows a user to select the type of files displayed in scroll menu 94. In this example "all files" is selected. A user may, however, desire to show, for example, only word processor documents or spreadsheets. Command buttons 100 and 102 allow a user to perform tasks such as deleting or renaming documents selected in scroll menu 94.

Once security module 30 successfully authenticates the user and verifies the source of the instructions to access resource 26 presented in step 60, resource module 24 communicates with resource 26 and obtains the data needed to enable application server 22 to return content for third frame 76 to client 16. When the user, through web page 70, instructs application 20 to acquire and produce a document selected in third frame 76, the process then repeats with step 56. The instructions to acquire the selected document are signed and then returned to application service 12 in step 58.

Although the flow chart of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention. The screen display of FIG. 6 is exemplary only. There exist many possible layout and control configurations for interfaces that will allow a user to interact with application service 12 and resource service 14. FIG. 6 merely provides one such example.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. In a computer network, a method for granting a request from a first resource to access a second resource, comprising:
   on behalf of the second resource, receiving from the first resource, digitally signed instructions directing the first resource to access the second resource;
   independent of the first resource, utilizing data used to sign the instructions received from the first resource to verify that the instructions originated from an authorized source other than the first resource; and
   granting the first resource access to the second resource only upon verifying that the instructions originated from an authorized source other than the first resource, the authorized source being a user of a client device interacting with the first resource via the computer network.

2. The method of claim 1, further comprising, before granting access, acquiring policy data for the first resource, and wherein granting access comprises granting access to the second resource according to the acquired policy data and only upon verifying that the instructions originated from an authorized source other than the first resource.

3. The method of claim 1, wherein the act of utilizing data comprises obtaining a digital certificate used to sign the instructions and verifying that the digital certificate belongs to an authorized source other than the first resource.

4. In a computer network, a method for granting a request from a first resource to access a second resource, comprising:
- with data identifying a user of a client device, digitally signing instructions directing the first resource to access the second resource;
- the client device providing, via the computer network, the first resource with the signed instructions;
- the first resource providing, via the computer network, the signed instructions with a request to access the second resource;
- on behalf of the second resource, receiving the signed instructions and, independent of the first resource, using the data signing the instructions, verifying that the instructions originated with the user;
- granting the first resource access to the second resource only upon verifying that the instructions originated with the user of the client device.

5. The method of claim 4, further comprising, before granting access, acquiring policy data for the first resource, and wherein granting access comprises granting access to the second resource according to the acquired policy data and only upon verifying that the instructions originated with the user.

6. The method of claim 4, further comprising obtaining a digital certificate used to sign the instructions and wherein the act of verifying comprises verifying that the digital certificate belongs to the user.

7. In a computer network, a method comprising:
- acquiring from a client device via the computer network digitally signed instructions directing a first resource to access a second resource;
- requesting access to the second resource providing the signed instructions;
- on behalf of the second resource, receiving the signed instructions and, independent of the first resource, utilizing data used to sign the instructions to verify that the request originated from an authorized source other than the first resource;
- granting the first resource access to the second resource only upon verifying that the instructions originated from an authorized source other than the first resource, the authorized source being a user of the client device; and
- the first resource accessing the second resource according to the acquired instructions if access is granted.

8. The method of claim 7, further comprising, before granting access, acquiring policy data for the first resource, and wherein granting access comprises granting access to the second resource according to the acquired policy data and only upon verifying that the instructions originated from an authorized source other than the first resource.

9. The method of claim 7, wherein instructions are signed with a digital certificate and wherein the act of utilizing data comprises obtaining the digital certificate used to sign the instructions and verifying that the digital certificate belongs to an authorized source other than the first resource.

10. A computer readable storage medium having computer executable instructions for:
- on behalf of a second resource, receiving from a first resource, digitally signed instructions directing the first resource to access the second resource;
- independent of the first resource, utilizing data used to sign the instructions received from the first resource to verify that the instructions originated from an authorized source other than the first resource; and
- granting the first resource access to the second resource only upon verifying that the instructions originated from an authorized source other than the first resource, the authorized source being a user of a client device interacting with the first resource via the computer network.

11. The medium of claim 10, having further instructions for, before granting access, acquiring policy data for the first resource, and wherein the instructions granting access comprise instructions for granting access to the second resource according to the acquired policy data and only upon verifying that the instructions originated from an authorized source other than the first resource.

12. The medium of claim 10, wherein the instructions for utilizing data comprise instructions for obtaining a digital certificate used to sign the instructions and verifying that the digital certificate belongs to an authorized user other than the first resource.

13. A computer readable storage medium having computer executable instructions for:
- digitally signing instructions directing a first resource to access a second resource;
- providing, from a client device via a computer network, the first resource with the signed instructions;
- on behalf of a second resource and, receiving from the first resource the signed instructions via the computer network;
- independent of the first resource, utilizing data used to sign the instructions received from the first resource to verify that the instructions originated from an authorized source other than the first resource;
- granting the first resource access to the second resource only upon verifying that the instructions originated from an authorized source other than the first resource, the authorized source being a user of the client device.

14. The medium of claim 13, having further instructions for, before granting access, acquiring policy data for the first resource, and wherein granting access comprises granting access to the second resource according to the acquired policy data and only upon verifying that the instructions originated from an authorized source other than the first resource.

15. The medium of claim 14, wherein the instructions for utilizing data include instructions for obtaining a digital certificate used to sign the instructions and verifying that the digital certificate belongs to an authorized user of the client device.

16. A computer readable storage medium having computer executable instructions for:
- acquiring from a client device via a computer network digitally signed instructions directing a first resource to access a second resource;
- the first resource via the computer network requesting access to the second resource providing the signed instructions;
- on behalf of the second resource, receiving the signed instructions and, independent of the first resource, utilizing data used to sign the instructions to verify that the request originated from an authorized source other than the first resource;
- granting the first resource access to the second resource only upon verifying that the instructions originated from an authorized source other than the first resource, the authorized source being a user of the client device; and
- the first resource accessing the second resource according to the acquired instructions only if access is granted.

17. The medium of claim 16, having further instructions for, before granting access, acquiring policy data for the first resource, and wherein the instructions for granting access comprise instructions for granting access to the second resource according to the acquired policy data and only upon verifying that the instructions originated from an authorized source other than the first resource.

18. The medium of claim 16, wherein the instructions are signed with a digital certificate and wherein the instructions for utilizing data comprise instructions for obtaining the digital certificate used to sign the instructions and verifying that the digital certificate belongs to the user of the client device.

19. A system for use in a computer network to grant a first resource's request to access to a second resource, comprising:
 a resource server for the second resource operable to receive, from the first resource, digitally signed instructions directing the first resource to access the second resource, the resource server being independent of the first resource;
 a source verifier, independent of the first resource, operable to obtain data used to digitally sign the instructions and to verify that the instructions originated from an authorized source other than the first resource; and
 a gate keeper, independent of the first resource, operable to grant access to the second resource only upon verifying that the instructions originated from an authorized source other than the first resource, the authorized source being a user of a client device interacting with the first resource via the computer network.

20. The system of claim 19, wherein the gatekeeper is further operable to acquire policy data for the first resource and to grant access to the second resource according to the acquired policy data and only upon verifying that the instructions originated from an authorized source other than the first resource.

21. The system of claim 19, wherein the instructions are signed with a digital certificate and wherein the source verifier is operable to verify that the digital certificate belongs to an authorized source other than the first resource.

22. The system of claim 19, wherein the instructions include credentials, the system further comprising a user verifier operable to obtain and authenticate the credentials, and wherein the gate keeper is further operable to grant access only where the credentials are authentic.

23. A system for use in a computer network to grant a first resource's request to access to a second resource, comprising:
 client programming operable to digitally sign instructions directing the first resource to access the second resource and to provide those instructions to the first resource via the computer network;
 a resource server for the first resource operable to receive the digitally signed instructions;
 a resource module for the first resource operable to request access to the second resource providing the signed instructions;
 a resource server for the second resource operable to receive the request from the first resource, the resource server for the second resource being independent of the first resource;
 a source verifier, independent of the first resource, operable to, using the data signing the instructions, verify that the instructions originated from an authorized source other than the first resource; and
 a gate keeper, independent of the first resource, operable to grant access to the second resource only upon verifying that the instructions originated from an authorized source other than the first resource, the authorized source being a user of the client programming.

24. The system of claim 23, wherein the gate keeper is further operable to acquire policy data for the first resource and to grant access to the second resource according to the acquired policy data and only upon verifying that the instructions originated from an authorized source other than the first resource.

25. The system of claim 23, wherein the client programming is operable to sign the instructions with a digital certificate and wherein the source verifier is operable to verify that the digital certificate belongs to the user of the client programming.

26. The system of claim 23, wherein the instructions include credentials, the system further comprising a user verifier operable to obtain and authenticate the credentials, and wherein the gate keeper is further operable to grant access only where the credentials are authentic.

27. A system for use in a computer network to grant a first resource's request to access to a second resource, comprising:
 a resource server for the first resource operable to receive from a client device via the computer network digitally signed instructions directing the first resource to access the second resource;
 a resource module for the first resource operable to request access to the second resource providing the signed instructions and to access the second resource when access is granted;
 a resource server for the second resource operable to receive digitally signed instructions provided with a request to access the second resource, the resource server for the second resource being independent of the first resource;
 a source verifier, independent of the first resource, operable to obtain data used to digitally sign the instructions and, using the obtained data, to verify that the instructions originated from an authorized source other than the first resource; and
 a gate keeper, independent of the first resource, operable to grant the first resource access to the second resource only upon verifying that the instructions originated from an authorized source other than the first resource, the authorized source being a user of the client device.

28. The system of claim 27, wherein the gate keeper is further operable to acquire policy data for the first resource and to grant access to the second resource according to the acquired policy data and only upon verifying that the instructions originated from an authorized source other than the first resource.

29. The system of claim 27, wherein the instructions are signed with a digital certificate and wherein the source verifier is operable to verify that the digital certificate belongs to the user of the client device.

30. The system of claim 27, wherein the instructions include credentials, the system further comprising a user verifier operable to obtain and authenticate the credentials, and wherein the gate keeper is further operable to grant access only where the credentials are authentic.

31. A system for use in a computer network to grant a first resource's request to access a second resource, comprising:
 a means for receiving, from the first resource, digitally signed instructions directing the first resource to access the second resource;
 a means, independent of the first resource, for obtaining data used to digitally sign the instructions;
 a means, independent of the first resource, for verifying that the obtained instructions originated from an authorized source other than the first resource; and
 a means, independent of the first resource, for granting the first resource access to the second resource only upon verifying that the instructions originated from an authorized source other than the first resource, the authorized source being a user of a client device interacting with the first resource via the computer network.

32. A system for use in a computer network to grant a first resource's request to access to a second resource, comprising:

a means for digitally signing instructions directing the first resource to access the second resource and to provide those instructions to the first resource from a client device via the computer network;

a means for requesting access to the second resource providing the signed instructions;

a means, independent of the first resource, for receiving the request with the signed instructions;

a means, independent of the first resource, for using data signing the instructions to verify that the instructions originated from an authorized source other than the first resource; and a means, independent of the first resource, for granting access to the second resource only upon verifying that the instructions originated from an authorized source other than the first resource, the authorized source being a user of the client device.

* * * * *